UNITED STATES PATENT OFFICE.

CHRISTIAN RUMM, OF STUTTGART, GERMANY.

COMPOUND FOR COMBATING FUNGOID DISEASES OF PLANTS.

No. 891,567.          Specification of Letters Patent.          Patented June 23, 1908.

Application filed November 15, 1907. Serial No. 402,268.

*To all whom it may concern:*

Be it known that I, CHRISTIAN RUMM, a citizen of the German Empire, residing at Stuttgart, in the Kingdom of Würtemberg, Empire of Germany, have invented certain new and useful Improvements in Compounds for Combating Fungoid Diseases of Plants; and I do hereby declare the following to be a full, clear, and exact description of the invention, such as will enable others skilled in the art to which it appertains to make and use the same.

This invention relates to a new compound or composition for combating fungoid diseases of plants.

By means of this improved compound it is possible to remove the drawbacks inherent in the well known compounds at present in use. These drawbacks consist substantially in the known copper-sugar-lime mixture when freshly prepared, containing by far the major part of the copper or approximately all the copper, in a flocculent precipitate, which easily stops up the opening in the spraying apparatus, so that it is impossible to spray the plant leaves in a thoroughly uniform and fine manner, however desirable this may be in order to afford the plant as complete protection as possible, and also in reducing the costs of spraying. After a few days also even the small quantities of copper which were originally dissolved are precipitated in an insoluble condition, and then the places sprayed act as regards the parasites substantially like those of simple un-sugared, copper-lime spraying compounds (Bordeaux-mixture), that is to say their poisonous action most probably only arises from the undissolved particles of copper compound and consequently it is necessary in order to injure and kill the parasites that they should come into direct contact with the undissolved copper particles (see the experiments of Frank Kruger "*Ueber den Einfluss der Kupfer-vitriol-Kalkbrühe auf die Kartoffelpflanze*" Berlin 1894; "*Arbeiten der Deutschen Landwirtschaftsgesellschaft*", page 32, and C. Rumm, "*Zur Kenntnis der Giftwirkung der Bordeauxbrühe und ihrer Bestandteile auf Spirogyra Longata*" and the "*Uredospores of Puccinia Coronata*"; *Beiträge zur Wissenschaftl. Botan.* by Fünfstück, Vol. I, 1895, page 94; 107/108; 111/112; 131; 139–142, and separate publication page 14; 27/28; 31/32; 51; 59–62).

Now it has long been known that in order to kill and injure parasites the smallest quantities of copper suffice, much less than are contained in the separate particles of the precipitates of the spraying solutions. Much copper is therefore wasted when the solutions hereinbefore mentioned are employed, and this increases the cost of the preparation unnecessarily and also involves the danger of too rapid an accumulation of copper in the ground. In fact the copper-sugar-lime spraying solutions hitherto proposed have met with no appreciation and have not been extensively used. All these drawbacks may be removed if the copper be completely dissolved, as, 1. The solution from the first contains the copper much more finely and more uniformly divided than any "mixture" with solid particles; it therefore remains entirely homogeneous even when very dilute.

2. In solutions the copper is therefore given the greatest possible surface; and is thus utilized to the greatest possible extent.

3. The solution may be sprayed through finer apertures (without stopping up the latter) than any other spraying compound with solid particles.

4. The solid products, when dried, of the solutions, more particularly when they are made amorphous, are very much more uniformly and constantly distributed, are also many times smaller than the directly sprayed particles of the present spraying compounds. In spite of that the use of clear or approximately clear solutions of copper compounds in calcium saccharates, has hitherto been avoided because it was feared that these solutions when sprayed on the leaves would not form a permanently effective insoluble copper compound, and thus would be again washed off by the first rain. In addition it was not known whether and in what manner the copper could be perfectly dissolved (which manner must be capable of being carried out in agricultural practice).

Now the applicant, after numerous experiments, has succeeded in avoiding the drawbacks hereinbefore mentioned, and in making and employing a clear copper lime sucrate solution, which does not stop up the apertures in the sprayer nozzles, in which solution in spite of that the separation of insoluble and thereby permanent copper on the leaves takes place in an extremely finely distributed condition. Such copper compound contains, as the applicant has ascertained, to each molecule of copper sulfate and cane sugar about 3 molecules of lime slaked to a powder. In employing these proportionate quantities, an almost perfect solution of combined copper oxid is formed, which however in the mixture, in case the same be sufficiently diluted, is present in such an unstable condition that after being sprayed on the leaves it is deposited in a condition insoluble in water, in consequence of its drying in the air, and by the constant contact of the latter, it is rapidly deposited in a permanently effective condition, insoluble in water.

For making the solution 1 molecule of crystalline or calcined copper sulfate, 1 molecule of sugar and about $2\frac{3}{4}$–$3\frac{1}{4}$ molecules of lime, according to its contents of $Ca(OH)_2$ slaked to powder, are used. The action of the lime is not in proportion to its quantities, but produces its maximum effect between the said limits. If therefore more or less lime be taken than is above indicated, less copper is dissolved in both cases.

According to the foregoing, approximately the following quantities, expressed in figures, may be employed:—

249.6 parts by weight of $CuSO_4$ 5 aq.
342 " " " " sugar
204–240 " " " " $Ca(OH)_2$.

The order in which the above substances are mixed with one another is of importance in the preparation of a suitable, permanent, high per cent. of the solution of the copper compound. It is preferable to introduce the calculated quantity of slaked lime gradually into the solution containing 1 molecule each of copper sulfate and sugar, or to gradually add the mixture consisting of the stated quantities of lime and sugar to the solution while stirring it. After the stirring it is allowed to settle and there is obtained, for instance where there is 1% of copper sulfate contained, an intensely dark blue solution which contains 94–97% of the total copper, while the small yellowish to bluish colored deposit or precipitate only contains a very slight residue of copper which may without harm be disregarded. If however copper sulfate and lime or all three substances be taken together in a dry mixture, or if I start with the solution of the copper compound and add simultaneously or subsequently sugar and dry sulfate of copper thereto, there results as the applicant has ascertained more or less heavy, clotty, or cheesy voluminous masses which partly contain 24–27% more of copper undissolved than the above mentioned precipitate.

The solution of the copper compound obtained according to the improved process is, when concentrated, as is necessary for spraying (at most $1\frac{1}{2}$% of sulfate) fairly stable for some days if stored in large vessels. It may therefore be easily kept in a finished condition for this time without the separation of solid copper compounds taking place sufficiently to be considered in practice. When the solution is sprayed onto the plants a considerable quantity of the copper separates in an insoluble form even on drying while by the continued action of the air the whole of the copper is somewhat rapidly so separated.

The precipitation from so uniformly fine a distribution in such a highly diluted solution takes place (as comparative microscopic observations of the applicant have shown) in numerous smaller particles than exist in any other hitherto known copper sugar lime spraying compounds, and thus a much more continuous coating results than in all solutions hitherto employed, which contain the copper from the first in solid form and coarse flocculent precipitates. By applicant's process therefore the same protective action is attained with a copper solution of lower percentage than with the higher percentage copper spraying compounds hitherto employed. At the same time the coating of the leaves is thinner and thereby does not absorb so much light falling on the leaves. (Compare Ewert "The Alternate Action of Light and Copper Lime Solutions on the Change of Material of Plants", *Landwirtsch Jahrbücher* 1905).

The carbonizing of the sprayed places on the vine leaves took place in the experiments made in a few days according to the weather. Injury to the leaves in consequence of the basicity of the preparation was in no case observed.

Spraying experiments of last year showed in a striking manner on the one hand the fungicide action of a 1% solution of the copper compound; the peronospora adhering with great tenacity to the unsprinkled vine leaves did not appear on the sprinkled ones. On the other hand the experiments showed the great permanency of the preparation on the leaves. Particles dating from the 15th July and the 14th August were very visible in spite of the continued rainy weather, still in the middle of October.

It is well known, that sugar and calcium form several calcium-saccharates, which under certain condition are capable of rendering generally considered unsoluble metal oxids (for instance $Cu(OH)_2$ soluble in water. Thereby additional products of certain molecular combination are formed. It is not yet known, what exact conditions are necessary for the formation of this double combination, and under what conditions the best result is obtained, and likewise if it is at all possible, to render the copper completely soluble in such combinations.

After a series of experiments, applicant has ascertained the following:

1:—Mono- di- and tricalcium-saccharate precipitate copper from soluble copper compounds in the form of a hydrate, as follows:

$$CuSO_4 + CaO.sugar + water = Cu(OH)_2 + CaSO_4 + sugar.$$

2:—The $Cu(OH)_2$ is again dissolved by the use of mono- and dicalcium saccharate, when the latter is used in large quantities. The reaction is likely as follows:

$$Cu(OH)_2 + CaO.sugar = CaO.CuO.sugar + water,$$

or:

$$Cu(OH_2 + (CaO)_2.sugar = CuO.(CaO.)_2.sugar + water.$$

3:—To dissolve as much copper as possible, the formation of tricalcium saccharate must be avoided; this is accomplished by adding the calcium compound slowly and in small quantities to the $CuSO_4$ sugar solution. Reaction as follows:

I:—$CuSO_4 + sugar + Ca(OH)_2 = CaSO_4 + Cu(OH)_2 + sugar.$

II:—$Cu(OH)_2 + sugar + Ca(OH)_2 = CuO.CaO.sugar + 2\ water.$

III:—$CuO.CaO.sugar + Ca(OH)_2 = CuO.(CaO)_2.sugar + 1\ water;$ in other words, there is first formed $Cu(OH)_2$ and $CaSO_4$; the greatest part of the latter, on account of the presence of considerable sugar, is rendered soluble; the former $Cu(OH)_2$ combines with sugar and with some more of $Ca(OH)_2$ and forms: CuO.CaO.sugar and $CuO.(CaO)_2$.sugar; both combinations are likely to exist in the compound.

4:—In the above stated reaction a very small amount of tricalcium saccharate is formed—and accordingly some particles of the $Cu(OH)_2$ remain undissolved.

5:—The copper-calcium-saccharates contained in the compound undergo radical changes under different conditions: under the influence of oxygen (during the spraying or drying), $Cu(OH)_2$ is precipitated; under the influence of the carbonic acid in the air and water (rain, dew)—the said copper-calcium-saccharates are changed into copper carbonates. In both cases the copper is rendered unsoluble.

From the hitherto known methods in which fungoid diseases of plants are treated with copper-lime sucrate, this process differs first by no compound with flocculent precipitates being employed, but solutions with the finest conceivable distribution of the copper compound. This has the advantage that a finer spraying of the medium is attained as smaller nozzles may also be used than with flocculent mixtures, and thus a more intense and uniform action of the medium may be obtained. Thus the improved compound has the advantage that by the use of the unstable copper solution, the copper is precipitated somewhat rapidly and uniformly on the plants or leaves by the action of carbonic acid in the air, so that it cannot be washed away by later rainfalls as is the case with other fluids which contain the copper dissolved in a stable condition.

By the use of this improved compound the result is therefore attained that the copper yields a more intense action in the smallest possible quantities, so that its fungicide action is fully utilized, while the drawbacks of the previous flocculent copper sugar-lime-mixtures are avoided.

I declare that what I claim is:—

The herein described composition for treating plants by spraying, consisting of a clear aqueous solution of saccharate of lime and a copper salt in substantially the proportions of four to one, respectively, substantially as described.

In testimony whereof I affix my signature, in presence of two witnesses.

CHRISTIAN RUMM.

Witnesses:
JEAN GULDEN,
HERM. HOPPE.